United States Patent
Uematsu et al.

(10) Patent No.: US 12,554,984 B2
(45) Date of Patent: Feb. 17, 2026

(54) REPRESENTATION LEARNING APPARATUS, METHOD, AND STORAGE MEDIUM

(71) Applicant: KABUSHIKI KAISHA TOSHIBA, Tokyo (JP)

(72) Inventors: Kazuki Uematsu, Fuchu (JP); Mitsuhiro Kimura, Fuchu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 505 days.

(21) Appl. No.: 18/171,427

(22) Filed: Feb. 20, 2023

(65) Prior Publication Data

US 2023/0394302 A1   Dec. 7, 2023

(30) Foreign Application Priority Data

Jun. 1, 2022 (JP) .................. 2022-089693

(51) Int. Cl.
*G06N 3/08* (2023.01)
(52) U.S. Cl.
CPC .................. *G06N 3/08* (2013.01)
(58) Field of Classification Search
CPC .......................................... G06N 3/08
See application file for complete search history.

(56) References Cited

U.S. PATENT DOCUMENTS

| | | | | |
|---|---|---|---|---|
| 2018/0174071 A1* | 6/2018 | Bhatt | .............. | G06F 18/2134 |
| 2018/0196873 A1* | 7/2018 | Yerebakan | ........... | G16H 15/00 |
| 2018/0218284 A1* | 8/2018 | Jawahar | ............... | G06N 3/082 |
| 2019/0251480 A1* | 8/2019 | Garcia Duran | ......... | G06N 3/08 |
| 2020/0320416 A1* | 10/2020 | Gillian | ............... | G06N 3/0495 |
| 2020/0356851 A1* | 11/2020 | Li | ........................ | G06F 40/30 |
| 2021/0334459 A1* | 10/2021 | Dvijotham | ............ | G06F 40/216 |
| 2022/0366898 A1* | 11/2022 | Qian | ...................... | G10L 15/22 |

(Continued)

FOREIGN PATENT DOCUMENTS

JP   2020-534594   11/2020

OTHER PUBLICATIONS

Lee, K. et al. "i-MIX: A Domain-Agnostic Strategy for Contrastive Representation Learning" Proceedings of the Ninth International Conference on Learning Representations (ICLR 2021) (19 pages).

(Continued)

*Primary Examiner* — David E Choi
(74) *Attorney, Agent, or Firm* — Oblon, McClelland, Maier & Neustadt, L.L.P.

(57) ABSTRACT

The representation learning apparatus acquires M second-type mixed feature representations extracted from M first-type mixed feature representations. The apparatus acquires M mixed labels obtained by mixing N labels. The apparatus calculates the L similarities of L label combinations selected from the M mixed labels. Each of the L label combinations has K mixed labels selected from the M mixed labels, each of the L similarities represents the degree of similarity of the K mixed labels, and the L similarities are formulated based on a qualitative and quantitative constraint condition. The apparatus performs a computation of a loss function based on the M second-type mixed feature representations and the L similarities.

11 Claims, 15 Drawing Sheets

(56) References Cited

U.S. PATENT DOCUMENTS

| | | | | |
|---|---|---|---|---|
| 2023/0252769 A1* | 8/2023 | Bhat | .................... | G06V 10/761 |
| | | | | 382/157 |
| 2023/0274533 A1* | 8/2023 | Isobe | ................... | G06V 10/774 |
| | | | | 382/157 |
| 2023/0394302 A1* | 12/2023 | Uematsu | .................. | G06N 3/08 |
| 2025/0299586 A1* | 9/2025 | Xia | ..................... | G06N 3/0442 |

OTHER PUBLICATIONS

Du, Y. et al. "Constructing Contrastive Samples via Summarization for Text Classification with Limited Annotations" Findings of the Association for Computational Linguistics: EMNLP 2021, pp. 1365-1376, Punta Cana, Dominican Republic, Association for Computational Linguistics (12 pages).

Office Action mailed November 114, 2025, in Japanese Application No. 2020-089693 filed May 22, 2020 (w/English translation—citing documents Nos. 19 and 28).

Yangkai Du et al., "Constructing Contrastive Samples via Summarization for Text Classification with Limited Annotations", Nov. 29, 2021, 13 pages.

\* cited by examiner

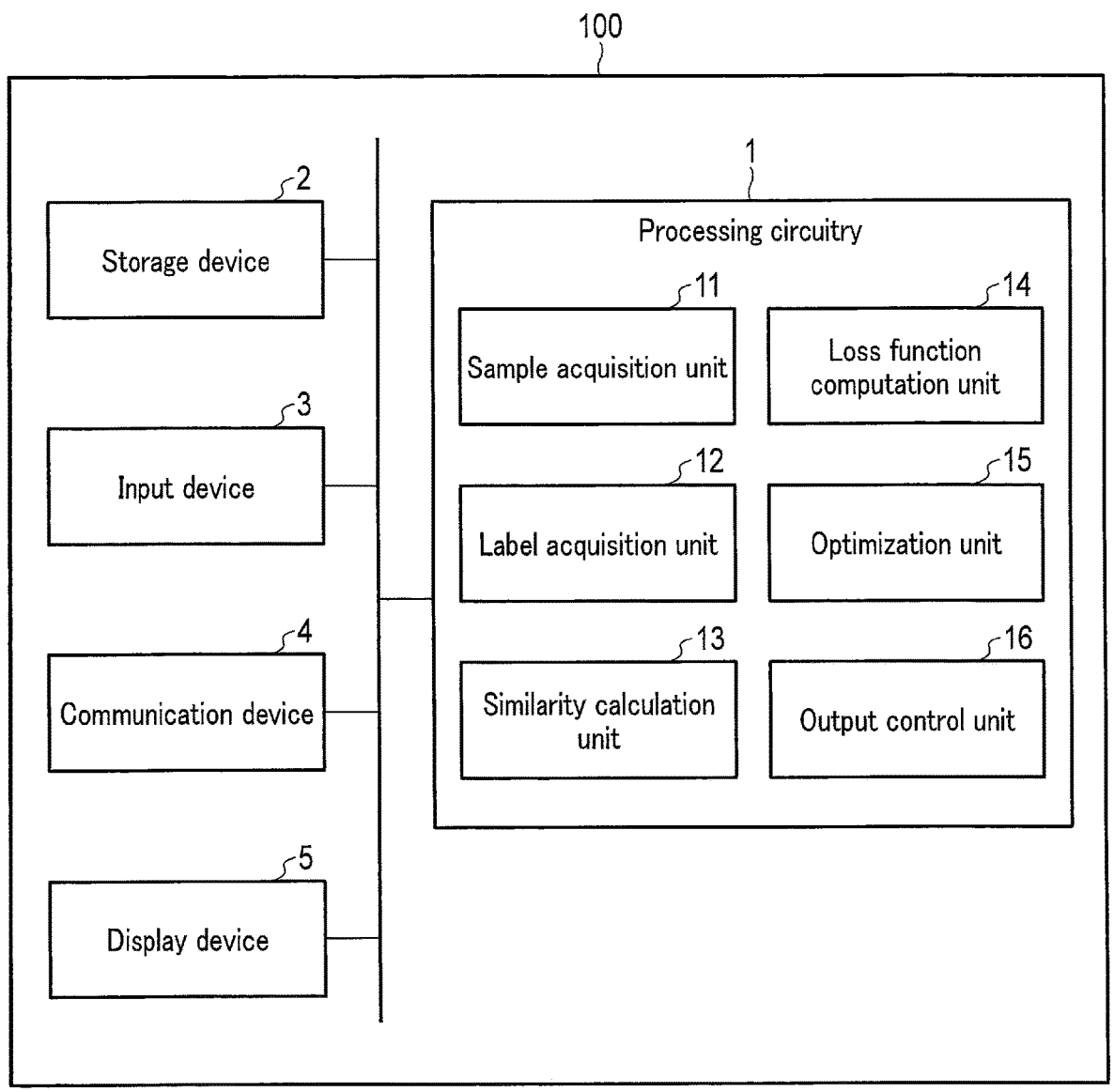
F I G. 1

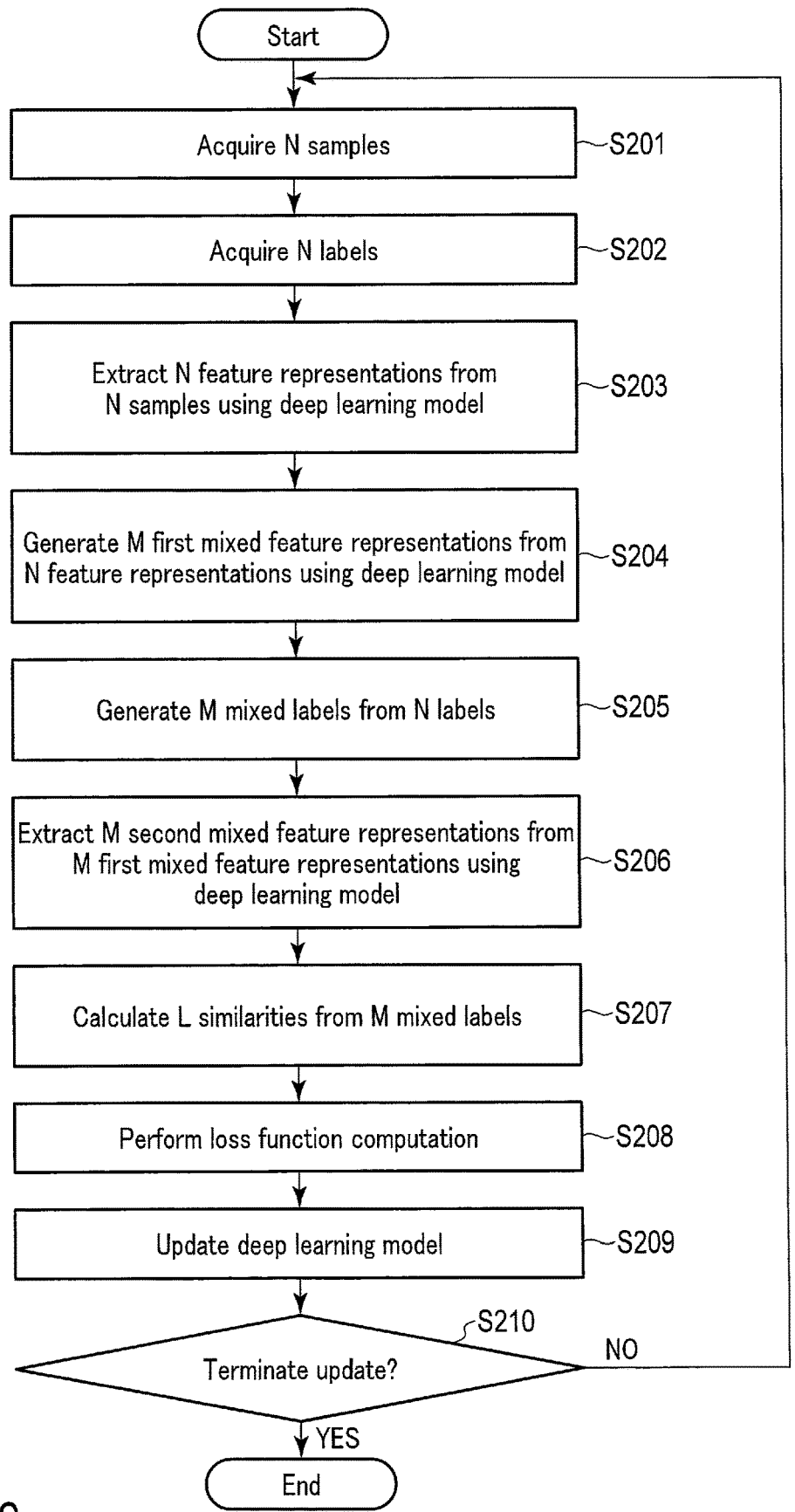
F I G. 2

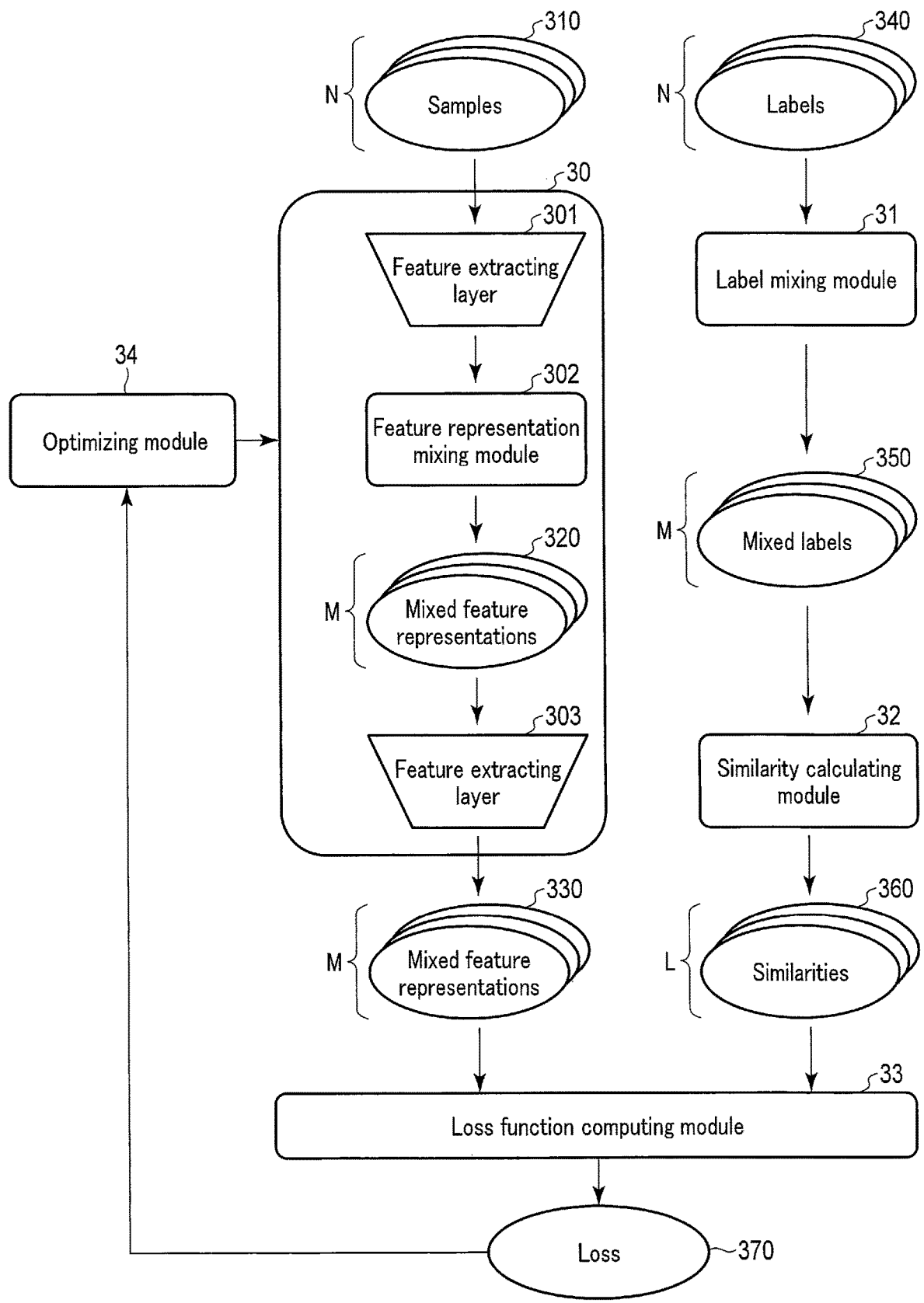
F I G. 3

Unsupervised label $$c_{SimCLR} = \begin{pmatrix} 0 & 1 & 0 & 0 & 0 & 0 & 0 & 0 \\ 1 & 0 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \\ 0 & 0 & 0 & 0 & 0 & 1 & 0 & 0 \\ 0 & 0 & 0 & 0 & 1 & 0 & 0 & 0 \\ 0 & 0 & 0 & 0 & 0 & 0 & 0 & 1 \\ 0 & 0 & 0 & 0 & 0 & 0 & 1 & 0 \end{pmatrix} \begin{matrix} \\ \text{Img1} \\ \\ \text{Img2} \\ \\ \text{Img3} \\ \\ \text{Img4} \end{matrix}$$

$\underbrace{\text{Img1} \quad \text{Img2}}_{\text{Class 1}} \underbrace{\text{Img3} \quad \text{Img4}}_{\text{Class 2}}$

F I G. 5

Supervised label $$c_{SupCLR} \propto \begin{pmatrix} 0 & 1 & 1 & 1 & 0 & 0 & 0 & 0 \\ 1 & 0 & 1 & 1 & 0 & 0 & 0 & 0 \\ 1 & 1 & 0 & 1 & 0 & 0 & 0 & 0 \\ 1 & 1 & 1 & 0 & 0 & 0 & 0 & 0 \\ 0 & 0 & 0 & 0 & 0 & 1 & 1 & 1 \\ 0 & 0 & 0 & 0 & 1 & 0 & 1 & 1 \\ 0 & 0 & 0 & 0 & 1 & 1 & 0 & 1 \\ 0 & 0 & 0 & 0 & 1 & 1 & 1 & 0 \end{pmatrix} \begin{matrix} \\ \text{Img1} \\ \\ \text{Img2} \\ \\ \text{Img3} \\ \\ \text{Img4} \end{matrix}$$

$\underbrace{\text{Img1} \quad \text{Img2}}_{\text{Class 1}} \underbrace{\text{Img3} \quad \text{Img4}}_{\text{Class 2}}$

F I G. 6

| Data augmentation | Range of mixture ratio | Similarity X $y_i'^T y_j$ | Similarity Y $y_i'^T y_j'$ | Similarity Z $1-D_{JS}(y_i'\|\|y_j')$ |
|---|---|---|---|---|
| Base | 0.000 – 0.000 | | 94.68 | |
| Base + Mixup | 0.001 – 0.300 | 94.96 | 95.38 | 95.23 |
| | 0.001 – 0.500 | 95.64 | 95.49 | 95.60 |
| | 0.001 – 0.999 | 95.90 | 95.92 | 95.75 |
| Base + CutMix | 0.001 – 0.300 | 95.80 | 95.85 | 96.43 |
| | 0.001 – 0.500 | 96.33 | 96.72 | 96.95 |
| | 0.001 – 0.999 | 96.71 | 96.55 | 96.50 |

F I G. 9

| Data augmentation | Score | CIFAR-100 | SVHN | MNIST | Random |
|---|---|---|---|---|---|
| Base | AUROC | 0.884 | 0.923 | 0.906 | 0.916 |
| | AUPR | 0.878 | 0.920 | 0.912 | 0.942 |
| Base + CutMix | AUROC | 0.898 | 0.949 | 0.936 | 0.957 |
| | AUPR | 0.892 | 0.957 | 0.951 | 0.972 |

F I G. 10

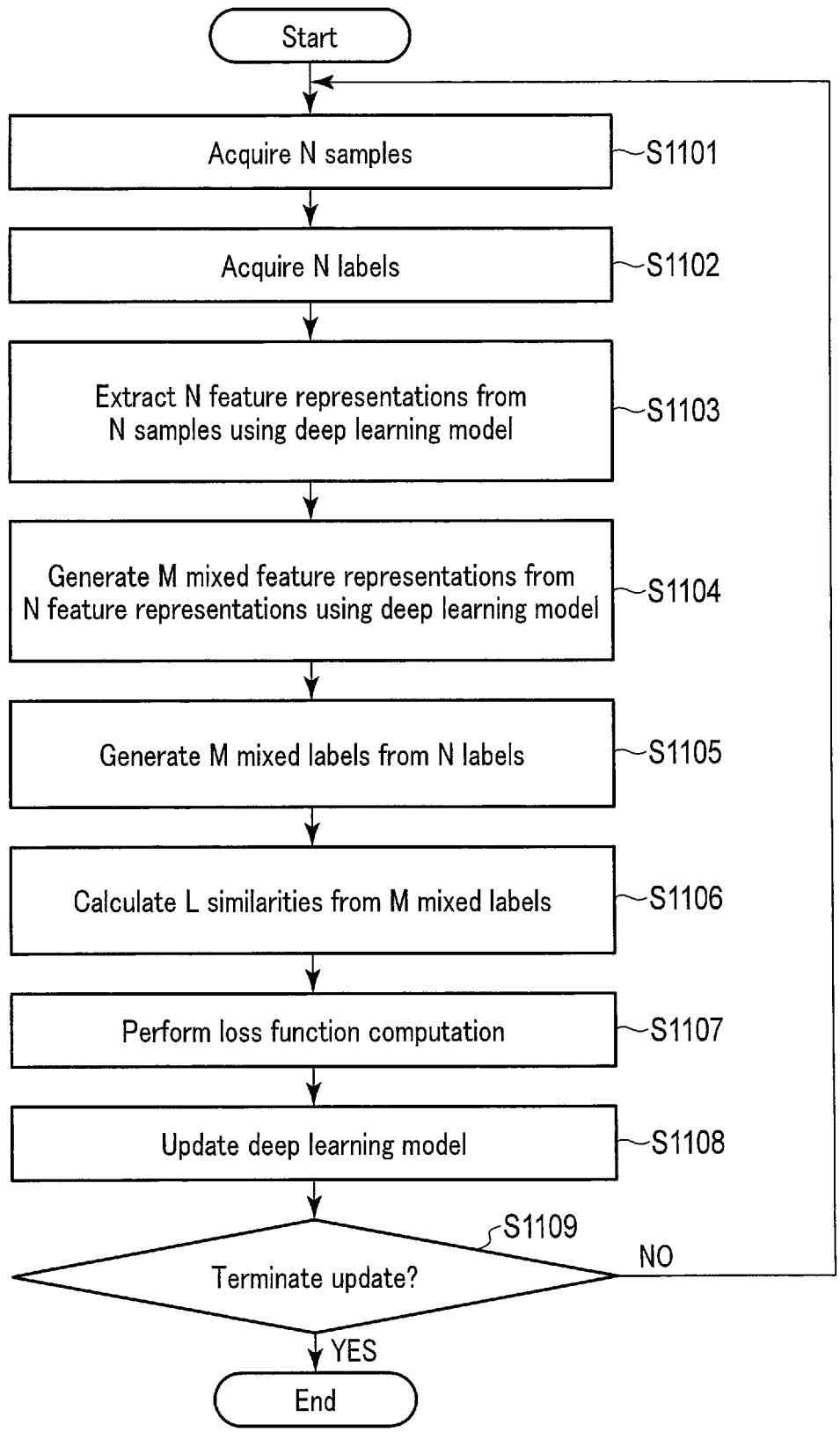
F I G. 11

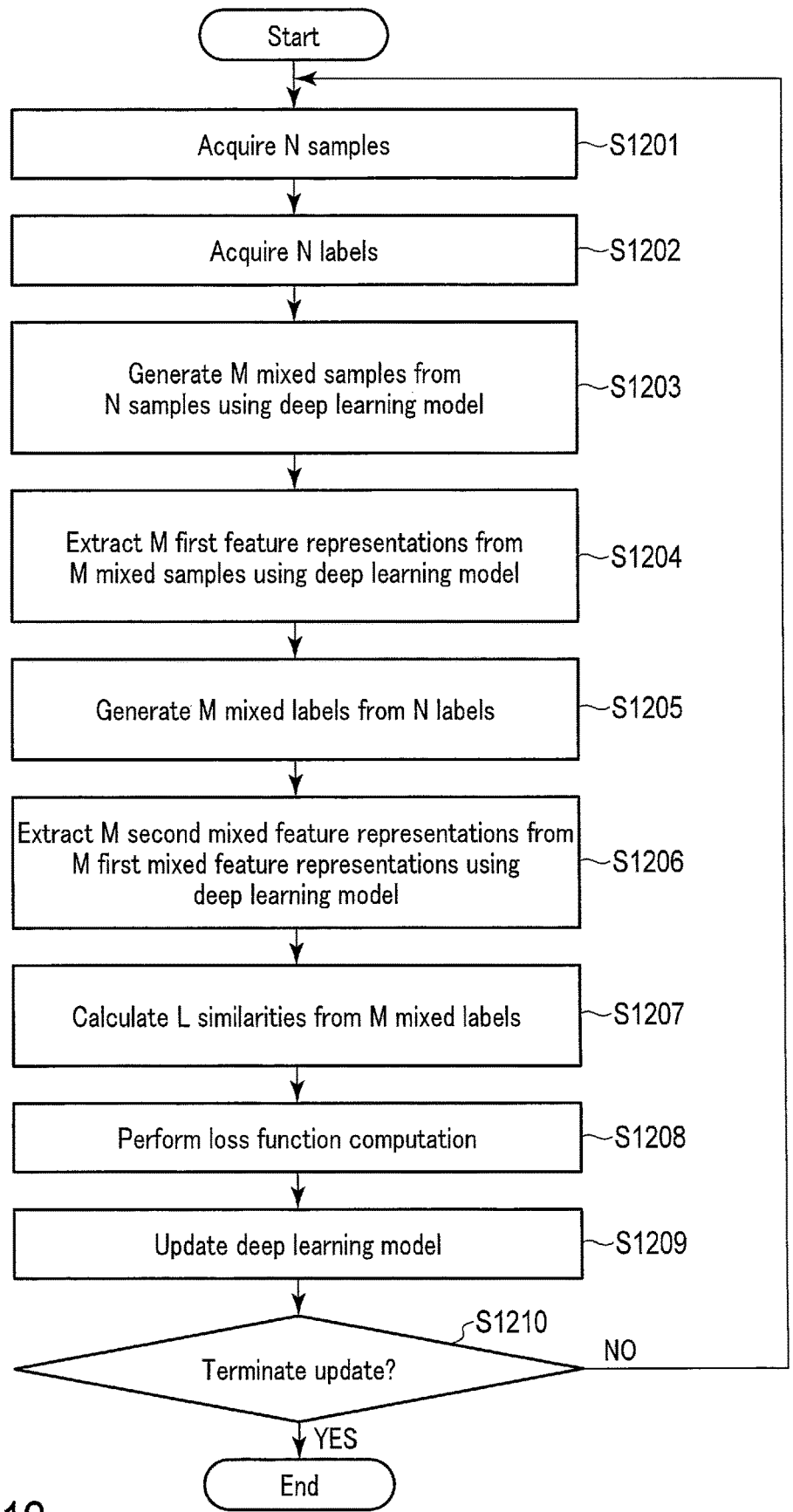
F I G. 12

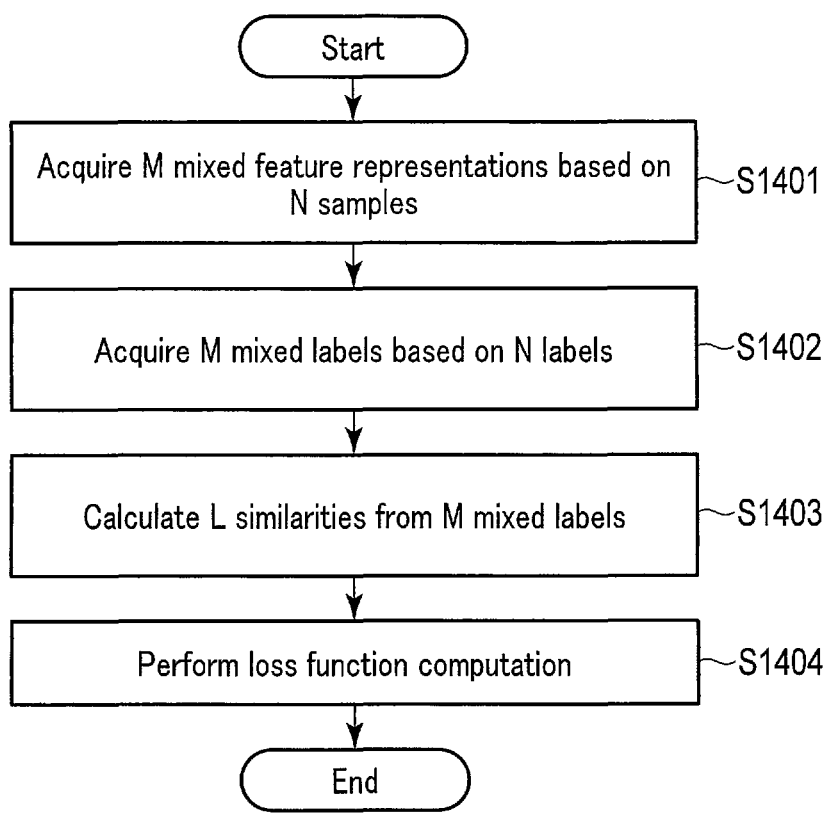
F I G. 14

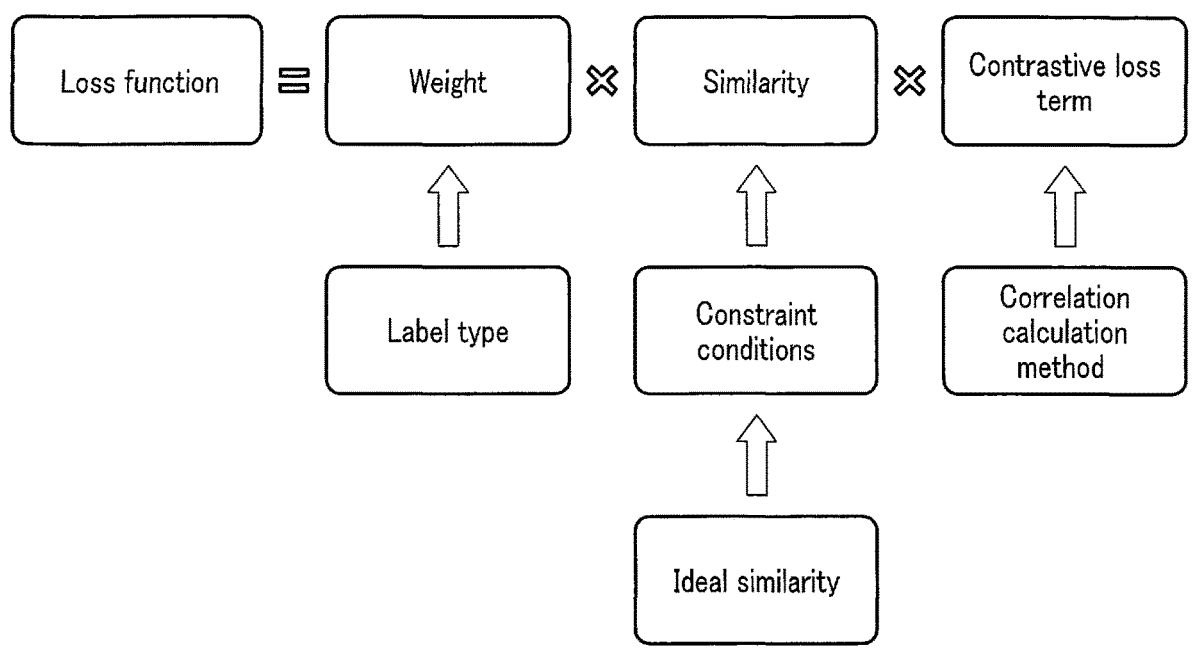
F I G. 16

REPRESENTATION LEARNING APPARATUS, METHOD, AND STORAGE MEDIUM

CROSS-REFERENCE TO RELATED APPLICATIONS

This application is based upon and claims the benefit of priority from Japanese Patent Application No. 2022-089693, filed Jun. 1, 2022, the entire contents of which are incorporated herein by reference.

FIELD

Embodiments described herein relate generally to a representation learning apparatus, a representation learning method, and a storage medium.

BACKGROUND

In the field of statistical machine learning models, or deep learning models in particular, attempts which designs a loss function using feature vectors have been actively made to improve the performance of models through representation learning. Furthermore, in order to ensure the diversity of samples at the time of learning, mixed-type data augmentation, in which samples are mixed and combined so as to increase the data diversity, has come to be known as effective. Attempts have been made to introduce the mixed-type data augmentation using label information into representation learning. Such attempts, however, are yet to be succeeded in accurately evaluating the similarity of mixed labels contained in mixed samples and therefore in designing a suitable loss function.

BRIEF DESCRIPTION OF THE DRAWINGS

FIG. 1 is a diagram for showing an exemplary configuration of a representation learning apparatus according to the present embodiment.

FIG. 2 is a diagram for showing the procedure of a representation learning process according to Example 1.

FIG. 3 is a diagram for schematically showing the entire representation learning process according to Example 1.

FIG. 5 is a diagram for showing a matrix structure of the similarity $c_{SimCLR}$ in the use of an unsupervised label.

FIG. 6 is a diagram for showing a matrix structure of the similarity $c_{SupCLR}$ in the use of a supervised label.

FIG. 9 is a table showing the classification accuracy rates of deep learning models according to the present embodiment, Comparative Example 1, and Comparative Example 2.

FIG. 10 is a table showing scores obtained in an out-of-distribution detection conducted upon multiple detection targets.

FIG. 11 is a diagram for showing the procedure of the representation learning process according to Example 2.

FIG. 12 is a diagram for showing the procedure of the representation learning process according to Example 3.

FIG. 14 is a diagram for showing the procedure of the representation learning process according to the present embodiment.

FIG. 16 is a diagram for schematically showing an exemplary design of a loss function according to the evolutionary example.

DETAILED DESCRIPTION

Figure 4:
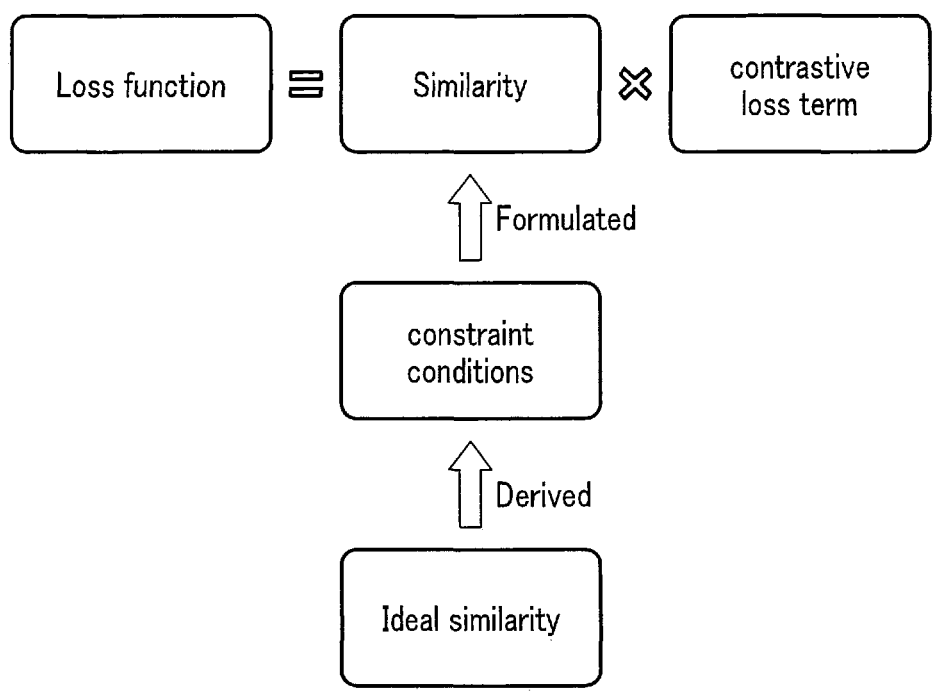
FIG. 4 is a diagram for schematically showing an exemplary design of a loss function according to the present embodiment.

The representation learning apparatus according to the present embodiment includes a sample acquisition unit, a label acquisition unit, a similarity calculation unit, and a loss function computation unit. The sample acquisition unit acquires M first-type mixed feature representations, M second-type mixed feature representations, M third-type mixed feature representations, or M fourth-type mixed feature representations, where the M first-type mixed feature representations are obtained by mixing feature representations of N samples, the M second-type mixed feature representations are extracted from the M first-type mixed feature representations, the M third-type mixed feature representations are feature representations that are extracted from M mixed samples obtained by mixing the N samples, and the M fourth-type mixed feature representations are feature representations that are extracted from the M third-type mixed feature representations. The label acquisition unit acquires M mixed labels that are obtained by mixing N labels respectively corresponding to the N samples. The similarity calculation unit calculates L similarities of L label combinations selected from the M mixed labels, where each of the L label combinations has K mixed labels selected from the M mixed labels, each of the L similarities represents a degree of similarity among the K mixed labels, and the L similarities are formulated based on a qualitative and quantitative constraint condition to be satisfied by the similarities. The loss function computation unit performs a computation of a loss function based on the L similarities and the M mixed feature representations of any one of the first to fourth types.

The representation learning apparatus and method, and the storage medium according to the present embodiment, will be described below with reference to the drawings.

FIG. 1 is a diagram for showing an exemplary configuration of a representation learning apparatus 100 according to the present embodiment. As illustrated in FIG. 1, the representation learning apparatus 100 is a computer that includes processing circuitry 1, a storage device 2, an input device 3, a communication device 4, and a display device 5. Data communication is conducted among the processing circuitry 1, storage device 2, input device 3, communication device 4, and display device 5 by way of a bus.

The processing circuitry 1 includes a processor such as a central processing unit (CPU) and a memory such as a random access memory (RAM). The processing circuitry 1 includes a sample acquisition unit 11, a label acquisition unit 12, a similarity calculation unit 13, a loss function computation unit 14, an optimization unit 15, and an output control unit 16. Through the execution of a representation learning program, the processing circuitry 1 realizes the functions of the units 11 to 16. This representation learning program is stored in a non-transitory computer-readable storage medium such as the storage device 2. The representation learning program may be implemented as a single program that describes all the functions of the units 11 to 16, or divided into several modules in accordance with some groups of functions. The units 11 to 16 may be implemented by an integrated circuit such as an application specific integrated circuit (ASIC). In such a case, the units may be implemented on a single integrated circuit or separately on different integrated circuits.

The sample acquisition unit 11 acquires M (where M is a natural number) mixed feature representations obtained by mixing the feature representations of N (where N is a natural number) samples; M other mixed feature representations extracted from the M mixed feature representations; M mixed feature representations extracted from M mixed samples obtained from M samples; or M other mixed feature representations, which are feature representations extracted from the M mixed feature representations. The sample acquisition unit 11 may acquire N samples, mixed samples, or feature representations. For the method of extracting feature representations from samples and the method of extracting mixed feature representations from mixed samples, the use of a statistical machine learning model such as a deep learning model is assumed. A sample represents a target data item to be processed by the processing circuitry 1. A sample may be data of any type as long as it can be labeled, examples of which may include image data, audio data, text data, and waveform data.

The label acquisition unit 12 acquires M mixed labels obtained by mixing N labels corresponding to the N samples. The label acquisition unit 12 may also acquire N labels.

The similarity calculation unit 13 calculates L (where L is a natural number) similarities of L combinations of mixed labels (hereinafter referred to as "label combinations") selected from the M mixed labels. Each of the L label combinations has K (where K is a natural number) mixed labels selected from M mixed labels. Each of the L similarities represents a degree of similarity among the K mixed labels. The L similarities are formulated based on the qualitative and quantitative constraint conditions to be satisfied by the similarities.

The loss function computation unit 14 performs a computation upon a loss function based on the L similarities and the M mixed feature representations of any one of the first to fourth types. In particular, the loss function computation unit 14 selects L combinations (hereinafter referred to as "sample combinations") from the M mixed feature representations of any one of the first to fourth types. Each of the L sample combinations has K mixed feature representations. The loss function computation unit 14 calculates the correlation of the K mixed feature representations for each of the L sample combinations. The loss function computation unit 14 calculates the loss function based on the L correlations and L similarities.

The optimization unit 15 updates the deep learning model based on the loss function. The optimization unit 15 determines whether or not the condition for update termination has been satisfied, and repeats the updating of the deep learning model until it is determined that the termination condition has been satisfied. Upon determination of the termination condition being satisfied, the optimization unit 15 outputs the current deep learning model as a trained deep learning model.

The output control unit 16 outputs data of various kinds. For instance, the output control unit 16 may display samples or mixed samples, feature representations, mixed feature representations, similarities, the training results of the deep learning model, the trained deep learning model, and the like on the display device 5; store them in the storage device 2; or transmit them to a different computer via the communication device 4.

The storage device 2 may be constituted by a read-only memory (ROM), a hard disk drive (HDD), a solid state drive (SSD), an integrated circuit storage device, and the like. The storage device 2 may store a representation learning program.

The input device 3 is configured to input various commands from the user. For the input device 3, a keyboard, a mouse, various switches, a touch pad, or a touch panel display may be used. An output signal from the input device 3 is supplied to the processing circuitry 1. As an input device 3, an input device for a computer that is connected in a wired or wireless manner to the processing circuitry 1 may be adopted.

The communication device 4 is an interface for communicating data between the representation learning apparatus 100 and external devices connected via a network.

The display device 5 displays various types of information. For instance, the display device 5 displays various kinds of data under the control of the output control unit 16. As a display device 5, a cathode-ray tube (CRT) display, liquid crystal display, organic electroluminescence (EL) display, light-emitting diode (LED) display, plasma display or any other display known in the field of this technique can be suitably used. The display device 5 may be a projector.

Various examples of the present embodiment will be described below.

Example 1

FIG. 2 is a diagram showing the procedure of a representation learning process according to Example 1. FIG. 3 is a diagram for schematically showing the entire representation learning process according to Example 1.

As illustrated in FIGS. 2 and 3, the sample acquisition unit 11 acquires N samples 310 (S201). The N samples 310 constitute a single, small batch. The N samples 310 may be originated from material data differing from each other. Alternatively, the N samples 310 may include standard samples and data obtained through data augmentation, such as geometric conversion and brightness conversion, conducted upon those samples.

After step S201, the label acquisition unit 12 acquires N labels 340 (step S202). The N labels 340 respectively correspond to the N samples 310. The types of labels 340 are not specifically limited, and at least one label type selected from a supervised label, a self-supervised label (or unsupervised label), and a semi-supervised label can be adopted. In other words, the processing according to the present embodiment can be implemented regardless of the types of labels. A supervised label denotes a label that is provided by a user or the like to the sample 310. A self-supervised label denotes a pseudo label provided based on the distribution of feature representations of the samples 310 or the types of the sample 310. For instance, this label is given to a data item that does not have a supervised label, in accordance with the clustering of feature representations or the like. With SimCLR, which is a typical self-supervised representation learning method, transformations $T_1$ and $T_2$ are applied to each data item, and the same data items subjected to different transformations are regarded as being in the same class, while data items prepared from different data are regarded as being in different classes. A semi-supervised label denotes a pseudo label given to a sample that does not have a supervised label, based on the distribution of feature representations of other samples having a supervised label, the distribution of feature representations of samples not having a supervised label, and types of samples. For instance, a semi-supervised label may be assigned, with reference to data having a few supervised labels, to data having no supervised label through the clustering of feature representations or the like. Semi-supervised labels and self-supervised labels may be referred to as "unsupervised labels".

After step S202, the sample acquisition unit 11 extracts N feature representations from the N samples 310, using a deep learning model 30 (step S203). The deep learning model 30 is a model that is yet to be trained. The deep learning model 30 is not particularly limited, and may implement any tasks such as an out-of-distribution (OOD) detection, image classification, object detection, audio recognition, and visual question answering (VQA).

After step S203, the sample acquisition unit 11 generates M first mixed feature representations 320 from the N feature representations, using the deep learning model 30 (step S204). In order to ensure the diversity of mixed feature representations, it is preferable that the number of possible mixed feature representations be larger than N, while in order to avoid the complexity of computation, it is preferable that M take a value approximately equal to N. In this example, two different feature representations are randomly extracted from N feature representations to form a unit, and two mixed feature representations are acquired for every unit. If one unit is formed after the formation of another, a constraint is placed such that any of the previously extracted feature representations will not be extracted again. Thus, the number of possible mixed feature representations is $_NC_2$, and the number of mixed feature representations actually used is M=N. The method of mixing the feature representations is not particularly limited, and a method such as Mixup, CutMix, or Manifold Mixup may be adopted. Furthermore, combinations of samples when generating mixed feature representations are not particularly limited. The feature representations of the same kind may be combined, a constraint may not be placed when forming multiple units, and three or more feature representations may be extracted from the N feature representations to form one unit.

After step S204, the label acquisition unit 12 generates the M mixed labels 350 from the N labels 340 (step S205). The label acquisition unit 12 of step S205 is implemented by a label mixing module 31. The label mixing module 31 is a program module provided independently from the deep learning model 30. The label mixing module 31 mixes the labels 340 in a manner corresponding to the method of mixing the feature representations at step S204. In this example, N/2 units are prepared from N labels 340, and two mixed labels 350 are obtained for every unit in a manner similar to the unit formation for the feature representations so that N mixed labels 350 can be generated. The mixing method is not particularly limited, and a method described in Mixup, CutMix, Manifold Mixup, or the like may be employed. The method of combining labels, however, should be conducted with the same method of combining samples.

After step S205, the sample acquisition unit 11 extracts M second mixed feature representations 330 from M the first mixed feature representations 320, using the deep learning model 30 (step S206).

The configuration of the deep learning model 30 will be explained below. As illustrated in FIG. 3, the deep learning model 30 includes a feature extracting layer 301, a feature representation mixing module 302, and a feature extracting layer 303. In a training stage, a network layer (head) downstream of the feature extracting layer 303, which contributes largely to the implementation of the tasks of the deep learning model 30, is removed.

The feature extracting layer 301 is a network layer that, upon input of samples 310, extracts feature vectors from the samples 310. The feature vectors are used as feature representations. The feature extracting layer 301 includes one or more network layers such as a convolution layer, a fully connected layer, multi-layer perceptron, a pooling layer, and a Dens layer. As such network layers, ResNet or VGGNet may be adopted. At step S203, the feature representation mixing module 302 extracts a feature representation from each of the N samples 310.

The feature representation mixing module 302 is provided downstream of the feature extracting layer 301. The feature representation mixing module 302 is a program module that generates M first mixed feature representations from the N feature representations at step S204.

The feature extracting layer 303 is provided downstream of the feature representation mixing module 302. The feature extracting layer 303 is a network layer that, in response to the input of a first mixed feature representation 320, extracts a feature vector from the first mixed feature representation 320. This feature vector is used as a second mixed feature representation 330, which is the feature representation of the first mixed feature representation. The feature extracting layer 303 includes one or more network layers such as a convolution layer, a fully connected layer, multi-layer perceptron, a pooling layer, and a Dens layer. As such network layers, ResNet or VGGNet may be adopted. At step S206, the feature extracting layer 303 extracts the second mixed feature representation 330 from each of the M first mixed feature representations 320.

As mentioned above, at step S204, in response to the input of the N samples to the first network layer (feature extracting layer 301) included in the deep learning model 30, the sample acquisition unit 11 extracts N first feature representations, and at step S206, in response to the input of M first mixed feature representations to the second network layer (feature extracting layer 303), provided downstream of the first network layer (feature extracting layer 301) included in the deep learning model 30 extracts M second mixed feature representations.

After step S206, the similarity calculation unit 13 calculates L similarities 360 from the M mixed labels 350 (step S207). The similarity calculation unit 13 of step S207 is implemented by the similarity calculating module 32. The similarity calculating module 32 is a program module provided independently from the deep learning model 30.

The similarity calculating module 32 calculates the L similarities 360 for the L label combinations selected from the M mixed labels 350. Each of the L label combinations includes K mixed labels selected from the M mixed labels. Each of the L similarities represents a degree of similarity among the K mixed labels in each of the L label combinations. In this example, K mixed labels are randomly extracted for label combination from the M mixed labels in a non-overlapping manner, and thereby all possible combinations are created. Here, the number of combinations is $L = {}_MC_K$. The value K matches the number of mixed feature representations, for which the correlation is calculated by the loss function computation unit 14. Among loss functions adopted for representation learning, it is typical to set K=2. The value, however, need not be limited. In addition to combinations, the order of combinations may be taken into consideration, and extraction may be conducted with overlapping mixed labels accepted.

The label combinations and their similarities will be explained, where K=2. The label combination of two mixed labels will be expressed as (MLi, MLj). The letters i and j are suffixes each indicating a mixed label. For this label combination (MLi, MLj), the similarity of MLi with respect to MLj is calculated. A specific case of three (M=3) mixed labels, ML1, ML2, and ML3, will be considered. The number L=3 ($=_3C_2$) of label combinations, (MLi, MLj)= (ML1, ML2), (ML1, ML3), and (ML2, ML3), are created from the three mixed labels ML1, ML2, and ML3, and a similarity is calculated for each of the label combinations.

After step S207, the loss function computation unit 14 performs a computation of a loss function (step S208). The loss function computation unit 14 of step S208 is implemented by the loss function computing module 33. The loss function computing module 33 is a program module provided independently from the deep learning model 30.

At step S208, the loss function computing module 33 performs the computation of the loss function based on the M second mixed feature representations 330 extracted at step S206 and the L similarities 360, and thereby calculates a loss 370. In particular, the loss function computing module 33 selects L sample combinations from the M second mixed feature representation 330. Each of the L sample combinations has K mixed feature representations. The loss function computing module 33 computes the correlation among the K mixed feature representations for each of the L sample combinations. Based on the L correlations and the L similarities, the loss function computing module 33 calculates the loss function.

The label combinations and their similarities will be explained, where K=2. Each of the L correlations represents the degree of correlation between two of the second mixed feature representations in the L sample combinations. A sample combination of two second mixed feature representations will be expressed as (MFRi, MFRj). The letters i and j are suffixes each indicating the second mixed feature representation. For the sample combination (MFRi, MFRj), a correlation of MFRi with respect to MFRj is calculated. A specific case of three (M=3) mixed feature representations, MFR1, MFR2, and MFR3, will be considered. The number L=3 ($=_3C_2$) of sample combinations (MFRi, MFRj)= (MFR1, MFR2), (MFR1, MFR3), (MFR2, MFR3) are created from the mixed feature representations MFR1, MFR2, and MFR3, and a correlation is calculated for each of the sample combinations.

Next, the design of a loss function according to the present embodiment will be described in detail. FIG. 4 schematically shows an exemplary design of the loss function according to the present embodiment. As illustrated in FIG. 4, the loss function is expressed as a product of a similarity and a contrastive loss term. As mentioned earlier, a similarity represents a degree of similarity among the K mixed labels in each of the L label combinations. A contrastive loss term is described as a correlation among the K second mixed feature representations in each of the L sample combinations.

As indicated in FIG. 4, a similarity is formulated based on the qualitative and quantitative constraint conditions that are to be satisfied by this similarity. In other words, the L similarities are derived from the constraint conditions that are satisfied by ideal similarities. The details of the constraint conditions may vary. For instance, the constraint conditions may include the similarity taking the lowermost value when the K mixed labels are the same (first condition); the similarity taking the uppermost value when the K mixed labels are at their most similar, and the lowermost value when the K mixed labels are at their least similar (second condition); and/or the similarities taking the same value when the K mixed labels exhibit symmetry (third condition). In the first condition and second condition, the lowermost value and uppermost value are not particularly defined. For instance, the lowermost value may be set to 0 and the uppermost value may be set to 1. In the third condition, the symmetry represents the interchangeability of the similarity of MLj to MLi with the similarity of MLi to MLj when K=2.

The first to third conditions are mathematically expressed below. The similarity of the mixed label i to the mixed label j is represented as $c_{ij}$. The value of the mixed label i is represented as $y_i'$. When labels are not mixed, $y_i'$ is typically represented by a vector of 1-of-K form.

$$\text{First condition: } c_{ii}=0 \quad (1)$$

$$\text{Second condition: } 0 \leq c_{ij} \leq 1, y_i'=y_j' \Leftrightarrow c_{ij}=1, \Sigma_c y_i'^{(c)} y_j'^{(c)} =0 \Leftrightarrow c_{ij}=0 \quad (2)$$

$$\text{Third condition: } c_{ij}=c_{ji} \quad (3)$$

For the similarity, its matrix structure may be designed in accordance with the label being a supervised label or not. FIG. 5 shows a matrix structure of the similarity $c_{SimCLR}$ with an unsupervised label in use, and FIG. 6 shows a matrix structure of the similarity $c_{SupCLR}$ with a supervised label in use. The unsupervised label denotes a semi-supervised label or a self-supervised label. When the label is an unsupervised one, unsupervised contrastive learning is executed as a learning algorithm of the deep learning model. When the label is a supervised one, supervised contrastive learning is executed as a learning algorithm of the deep learning model.

The examples of FIGS. 5 and 6 show matrix structures of the similarities among the labels corresponding to four sample images Img1, Img2, Img3, and Img4. The labels of the sample images Img1 and Img2 are classified into class 1, while the labels of the sample images Img3 and Img4 are classified into class 2. In the matrix structure of each of the similarity $c_{SimCLR}$ and similarity $c_{SupCLR}$, the rows and columns are respectively divided into four 2×2 matrix blocks. The first row of a matrix block represents a standard sample, and the second row represents a modified standard sample. Similarly, the first column of a matrix block represents a standard sample while the second column represents a modified standard sample. The diagonal components (matrix blocks in dashed-lined boxes, e.g., the row-1 column-1 block and the row-2 column-2 block) represent the similarity of the same labels. In this case, the value is set to 0 in accordance with the first condition. The off-diagonal components (e.g., the row-2 column-1 block and the row-1 column-2 block) represent the similarity of different labels belonging to the same class. In this case, the value is set to 1 in accordance with the second condition. As for the similarity $c_{SimCLR}$ and similarity $c_{SupCLR}$, interchangeable matrix blocks have the same similarity in accordance with the third condition.

In the unsupervised contrastive learning of FIG. as shown in the matrix blocks that are off-diagonal components, the similarity among different samples is always set to 0, regardless of the samples being in the same class or in different classes. In the supervised contrastive learning of FIG. 6, the similarity of different samples belonging to the same class is set to 1 in accordance with the second condition, as shown in the matrix blocks in dashed-dotted lined boxes (e.g., the row-2 column-1 block and row-1 column-2 block), since the two labels have the highest similarity. As shown in the row-3 column-1 block, the similarity of different samples of different classes is set to 0 in accordance with the second condition, since the mixed labels have the least similarity.

One example of the similarity $c_{ij}$ that satisfies the first to third conditions can be formulated based on the Jensen-Shannon divergence as expressed below in Expression (4) or the cosine similarity as expressed in Expression (5). $H(\cdot)$ in Expression (4) indicates Shannon entropy.

$$c_{ij}=1-D_{JS}(y'_i\|y'_j)=1-H((y'_i+y'_j)/2)+(H(y'_i)+H(y'_j))/2 \quad (4)$$

$$c_{ij}=y'^T_i y'_j/|y'_i\|y'_j| \quad (5)$$

As a loss function, the loss function $L^{(sup)}$ of the supervised contrastive learning may be used, as expressed in Expression (6). The loss function $L^{(sup)}$ is computed based on the contrastive loss term Log·, which depends on the similarity $c_{ij}$ and correlation $s(f_i, f_j)$. The correlation $s(f_i, f_j)$ represents a correction of the feature vector $f_i$ relative to the feature vector $f_j$. Alternatively, $c_{ij}'=c_{ij}/\Sigma_j c_{ij}$ obtained by normalizing $c_{ij}$ may be adopted as a similarity.

$$\mathcal{L}^{(sup)} = -\sum_{i,j} c_{ij} \log \frac{\exp(s(f_i, f_j)/\tau)}{\sum_{n \neq i} \exp(s(f_i, f_n)/\tau)} \quad (6)$$

The loss function is not limited by Expression (6). For instance, a loss function $L^{(MoCo)}$ obtained by generalizing the momentum contrast (MoCo) may be used, as expressed below in Expression (7). In this expression, $f_i$ indicates the feature representation obtained by inputting the data subjected to the transformation $T_1$ into the deep learning model, and $f_j^{\sim EMA}$ is obtained by inputting a sample to a model updated with the exponential moving average from the deep learning model having the same initial value as the one used for the acquisition of $f_i$. The samples to be input are originally formed of the same data as that for $f_i$, but transformation $T_2$ instead of $T_1$ is applied. $\mu_1$ is $f_j^{\sim EMA}$ obtained through previous iterative steps, and is stored in the storage device 2.

$$\mathcal{L}^{(MoCo)} = \quad (7)$$
$$-\sum_{i,j} c_{ij} \log \frac{\exp(s(f_i, f_j^{EMA})/\tau)}{\sum_n \exp(s(f_i, f_n^{EMA})/\tau) + \sum_m \exp(s(f_i, \mu_m)/\tau)} -$$
$$\sum_{i,l} c_{il} \log \frac{\exp(s(f_i, \mu_l)/\tau)}{\sum_n \exp(s(f_i, f_n^{EMA})/\tau) + \sum_m \exp(s(f_i, \mu_m)/\tau)}$$

For the loss function, the function obtained by generalizing the BYOL (bootstrap your own latent) may be adopted, as expressed in Expression (8), where $g(f_i)$ indicates the output from the multi-layer perceptron arranged downstream of the extraction of $f_i$.

$$\mathcal{L}^{(BYOL)}=2\Sigma_{ij}(1-c_{ij}s(g(f_i),f_j^{\sim EMA})) \quad (8)$$

Any other loss functions that employ a similarity of feature vectors may be adopted. The constraint conditions are not limited to the first to third conditions, and may be designed in accordance with the task type of the deep learning model and the type of the loss function.

After step S208, the optimization unit 15 updates the deep learning model 30 (step S209). The optimization unit 15 of step S209 is realized by the optimizing module 34. The optimizing module 34 updates a weighting parameter that is set for the training-targeted network layer among the network layers included in the deep learning model 30. The training targeted network layer may be the feature extracting layer 303. The optimizing module 34 updates the weighting parameter in accordance with the adaptively set update width (step width) in such a manner as to minimize the loss 370 of the loss function computed at step S208. The optimization method is not particularly limited, and any method such as stochastic gradient descent, AdaGrad, Adam, or the like may be adopted.

After step S209, the optimization unit 15 determines whether the updating should be terminated (step S210). The optimization unit 15 of step S210 is realized by the optimizing module 34. The optimizing module 34 determines whether the condition for update termination has been satisfied. The terminating condition may be defined, for example, as when the repetitions of the operations from step S201 to step S210 have reached a certain number, or when the loss 370 has fallen below a certain value. If the terminating condition is not satisfied (no at step S210), the operations at steps S201 through S210 are executed with the newly set number N of samples 310 and the newly set number N of labels 340, and repeated until the terminating condition is determined as being satisfied. If the optimizing module 34 determines that the terminating condition is satisfied (yes at step S210), the representation learning process is terminated. The output control unit 16 outputs the deep learning model obtained after the iterative steps, for which the terminating condition is satisfied, as a trained deep learning model.

In the above manner, the representation learning process of Example 1 is terminated.

The procedure of the representation learning process indicated in FIG. 2 is presented merely as an example, and should not be limited to FIG. 2. For example, step S202 should be executed before step S205, but does not always need to be executed between step S201 and step S203. Furthermore, step S205 should be executed between step S202 and step S207, but need not always be executed before step S206.

Next, differences in accuracies between the similarity according to the present embodiment and the similarity according to comparative examples will be examined. As comparative examples, Comparative Example 1 based on Non-patent Literature 1 (Kibok Lee, Yian Zhu, Kihyuk Sohn, Chun-Liang Li, Jinwoo Shin, and Honglak Lee, "i-Mix: A Domain-Agnostic Strategy for Contrastive Representation Learning," in Proceedings of the Ninth International Conference on Learning Representations (ICLR 2021)), and Comparative Example 2 based on Non-patent Literature 2 (Yangkai Du, Tengfei Ma, Lingfei Wu, Fangli Xu, Xuhong Zhang, Bo Long, and Shouling Ji, "Constructing Contrastive Samples via Summarization for Text Classification with Limited Annotations," in Findings of the Association for Computational Linguistics: EMNLP 2021, pages 1365-1376, Punta Cana, Dominican Republic. Association for Computational Linguistics) will be referred to.

Comparative Example 1 is intended to improve the accuracy of the loss function by combining representation learning with sample mixture. In Comparative Example 1, the data augmentation of a mixed type is applied to the representation learning by use of a loss function equivalent to $L^{(1)}$ in Expression (9), incorporating labels obtained both before and after the mixture.

$$\mathcal{L}^{(1)} = -\sum_{i,j} y_i'^T y_j \log \frac{\exp\left(\frac{s(f_i, f_j)}{\tau}\right)}{\sum_{n \neq i} \exp\left(\frac{s(f_i, f_n)}{\tau}\right)} \quad (9)$$

$$x_i' = \lambda T(x_i) + (1-\lambda)T(x_k), \quad y_i' = \lambda y_i + (1-\lambda)y_k$$

The original samples $x_i$ and $x_j$ are subjected to a transformation T, and the transformed samples $T(x_i)$ and $T(x_k)$ are weighed with a coefficient $\lambda$ to generate a mixed sample $x_i'$. Mixed samples are generated for all of the samples and input to the deep learning model to calculate the feature vector $f_i$ and a correlation $s(f_i, f_j)$ between feature vectors. In Comparative Example 1, the method for reflecting the sample mixtures to the loss function can be expressed by an inner product of a label $y_i'$ after the mixture and a label $y_j$ before the mixture. Finally, the correlation of feature vectors can be normalized with a hyper parameter $\tau$, referred to as a "temperature", so that the loss function $L^{(1)}$ is given as the sum of cross entropies of the softmax probabilities.

When the loss function $L^{(sup)}$ according to the present embodiment is compared with the loss function $L^{(1)}$ according to the Comparative Example 1, the similarity according to Comparative Example 1 can be expressed in Expression (10).

$$c_{ij} = y_i'^T y_j \quad (10)$$

Figure 7:
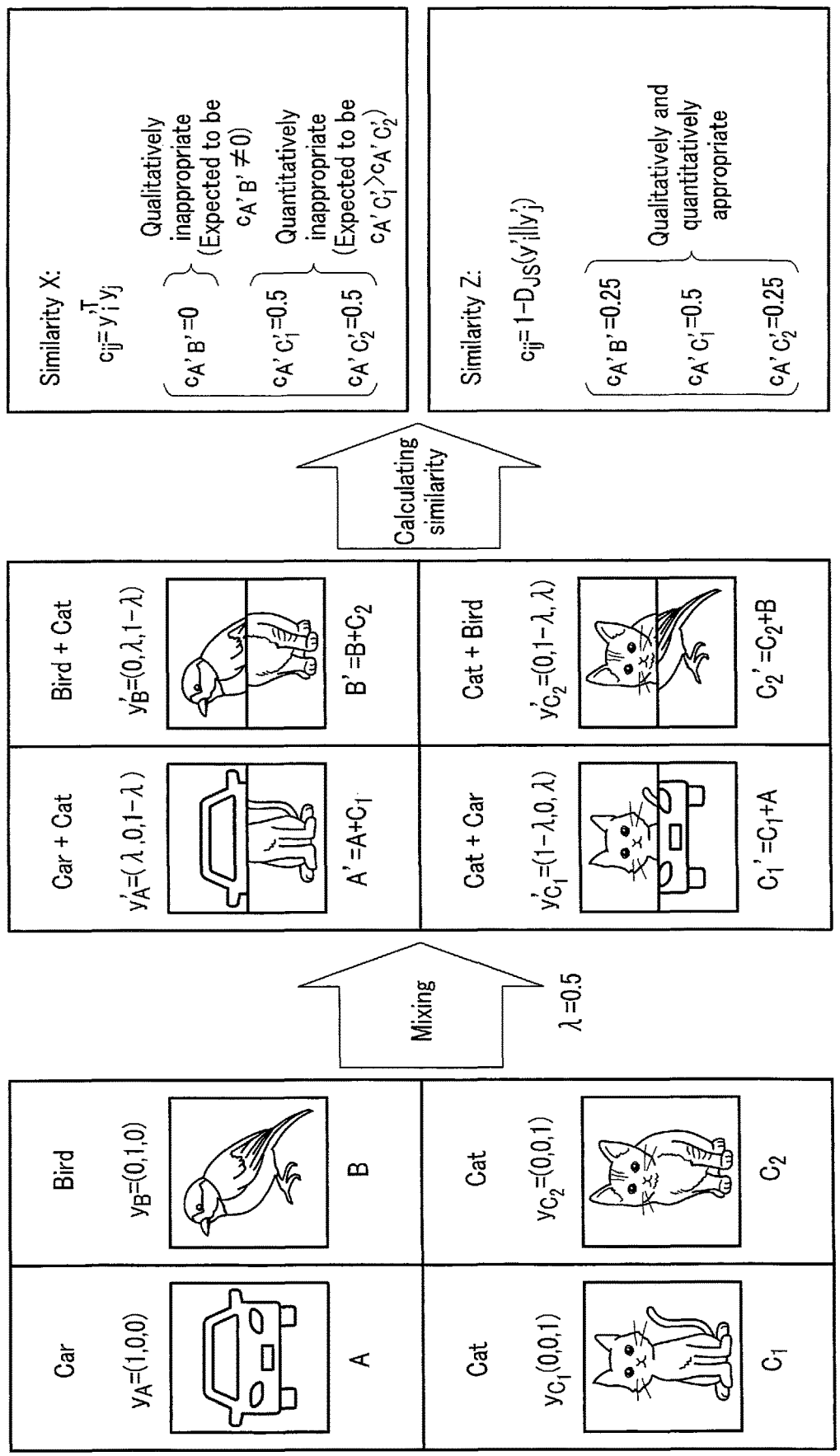
FIG. 7 is a diagram for showing the results of a comparison between the similarity Z according to the present embodiment and the similarity X according to Comparative Example 1.

FIG. 7 is a diagram for showing the result of the comparison between the similarity Z according to the present embodiment and the similarity X according to Comparative Example 1. The similarity Z is expressed by Expression (4), while the similarity X is expressed by Expression (10). Images are used as samples, and their labels y are represented by three-dimensional vectors. Sample A shown in the left box of FIG. 7 is an image of a car, having a label $y_A$ of (1, 0, 0). Sample B is an image of a bird, having a label $y_B$ of (0, 1, 0). Sample $C_1$ is an image of a cat, having a label $y_B$ of (0, 0, 1), and Sample $C_2$ is an image of another cat, having a label $y_{C2}$ of (0, 0, 1). The samples $C_1$ and $C_2$ are images of the same label "cat", but present different cats. As expressed in (11), the mixed label y' can be obtained from a weighted sum of the labels $y_i$ and $y_j$ prior to the mixture, with $\lambda$ serving as a weight. The weight $\lambda$ will be referred to as a "mixture ratio".

$$y_i' = \lambda y_i + (1-\lambda)y_j \quad (11)$$

In the middle boxes in FIG. 7, the mixed label $y_A'$ of the mixed sample A' obtained from the sample B mixed with the sample A is $(\lambda, 0, 1-\lambda)$; the mixed label $y_B'$ of the mixed sample B' obtained from the sample $C_2$ mixed with the sample B is $(0, \lambda, 1-\lambda)$; the mixed label $y_{C1}'$ of the mixed sample $C_1'$ obtained from the sample A mixed with the sample $C_1$ is $(1-\lambda, 0, \lambda)$; and the mixed label $y_{C2}'$ of the mixed sample $C_2'$ obtained from the sample B mixed with the sample $C_2$ is $(0, 1-\lambda, \lambda)$, according to Expression (11).

In the right boxes in FIG. 7, the similarity $C_{A'B'}$ of the mixed label $y_A'$ to the mixed label $y_B'$, the similarity $C_{A'C1'}$ of the mixed label $y_A'$ to the mixed label $y_{C1}'$, and the similarity $C_{A'C2'}$ of the mixed label $y_A'$ to the mixed label $y_{C2}'$, are calculated in accordance with the similarity Z (Expression (4)) according to the present embodiment and the similarity X (Expression (11)) according to Comparative Example 1. The mixture ratio $\lambda$ is set to 0.5 ($\lambda$=0.5).

Since the mixed label $y_A'$ and mixed label $y_B'$ both include a cat, $C_{A'B'} \neq 0$ is expected. In Comparative Example 1, however, $C_{A'B'}=0$ as indicated in the upper right box in FIG. 7, which is qualitatively inappropriate. Furthermore, since the mixed label $y_A'$ and mixed label $y_{C1}'$ include a car, while the mixed label $y_{C2}'$ does not include a car, $C_{A'C1'} > C_{A'C2'}$ is expected. In Comparative Example 1, however, $C_{A'C1'} = C_{A'C2'} = 0.5$, which is quantitatively inappropriate. Because of the use of the label $y_i$ prior to the mixture in the Comparative Example 1 to design a similarity as indicated in Expression (11), such inappropriate results are produced. In contrast, the similarity according to the present embodiment is $C_{A'B'}=0.25$ as indicated in the lower right box in FIG. 7, and is therefore $C_{A'B'} \neq 0$, as expected. Furthermore, according to the present embodiment, $C_{A'C1'}=0.5$ and $C_{A'C2'}=0.25$, which means that $C_{A'C1'} > C_{A'C2'}$, as expected. As can be seen from the above, the similarity Z according to the present embodiment is both qualitatively and quantitatively appropriate. This is because the similarity Z according to the present embodiment is formulated based on qualitative and quantitative constraint conditions.

In Comparative Example 2, an inner product of the labels obtained after the mixture is employed in introducing the data augmentation of a mixed type to the representation learning with the loss function $L^{(2)}$ indicated in Expression (12). The same processing is performed as in Comparative Example 1 to obtain the feature representation $f_i$ and mixed label $y_i'$.

$$\mathcal{L}^{(2)} = -\sum_{i,j} y_i'^T y_j' \log \frac{\exp\left(s(f_i, f_j)/\tau\right)}{\sum_{n \neq i} \exp\left(s(f_i, f_n)/\tau\right)} \quad (12)$$

When the loss function $L^{(sup)}$ according to the present embodiment is compared with the loss function $L^{(2)}$ according to Comparative Example 2, the similarity according to Comparative Example 2 can be represented in Expression (13).

$$c_{ij} = y_i'^T y_j' \quad (13)$$

Figure 8:
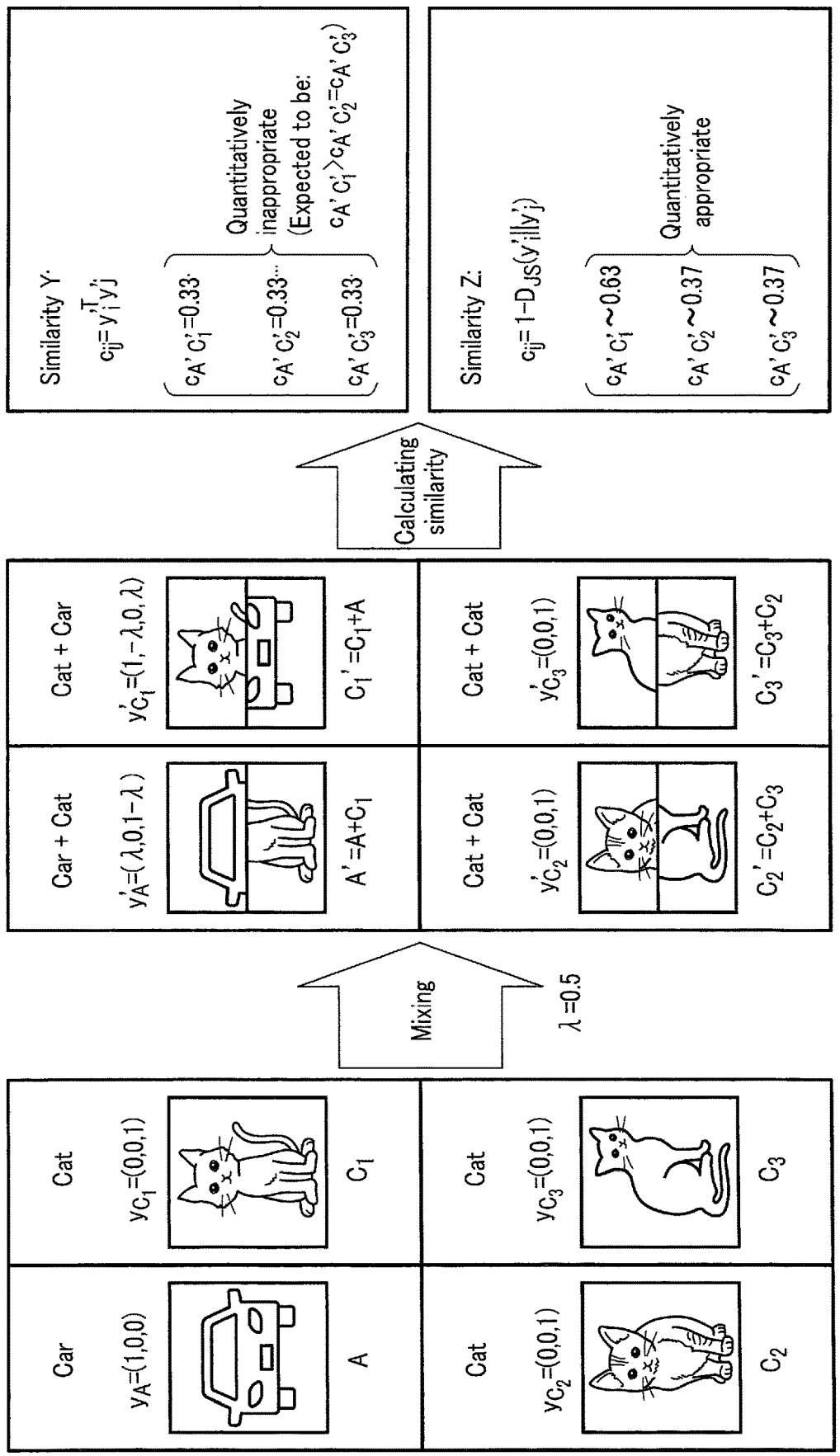
FIG. 8 is a diagram for showing the results of a comparison between the similarity Z according to the present embodiment and the similarity Y according to Comparative Example 2.

FIG. 8 is a diagram for showing the result of the comparison between the similarity Z according to the present embodiment and the similarity Y according to Comparative Example 2. The similarity Z is expressed by Expression (4), while the similarity Y is expressed by Expression (12). The symbols in FIG. 8 are assigned according to the same rules as in FIG. 7. Samples $C_1$, $C_2$, and $C_3$ are images of the same label "cat", but are presenting different cats.

In the middle boxes in FIG. 8, the mixed label $y_A'$ of the mixed sample A' obtained from the sample $C_1$ mixed with the sample A is $(\lambda, 0, 1-\lambda)$; the mixed label $y_{C1}'$ of the mixed sample B' obtained from the sample A mixed with the sample $C_1$ is $(1-\lambda, 0, \lambda)$; the mixed label $y_{C2}'$ of the mixed sample $C_2'$ obtained from the sample $C_3$ mixed with the sample $C_2$ is $(0, 0, 1)$; and the mixed label $y_{C3}'$ of the mixed sample $C_3'$ obtained from the sample $C_2$ mixed with the sample $C_3$ is $(0, 0, 1)$.

In the right boxes in FIG. 8, the similarity $C_{A'C1'}$ of the mixed label $y_A'$ to the mixed label $y_{C1}'$, the similarity $C_{A'C2'}$ of the mixed label $y_A'$ to the mixed label $y_{C2}'$, and the similarity $C_{A'C3'}$ of the mixed label $y_A'$ to the mixed label $y_{C3}'$ are calculated in accordance with the similarity Z (Expression (4)) according to the present embodiment and similarity Y (Expression (13)) according to Comparative Example 2.

Since both the mixed label $y_A'$ and mixed label $y_{C1}'$ include a car, while the mixed label $y_{C2}'$ and mixed label $y_{C3}'$ do not include a car, $C_{A'C1'}>C_{A'C2'}=C_{A'C3'}$ is expected. In Comparative Example 2, however, $C_{A'C1'}=C_{A'C2'}=C_{A'C3'}=0.33\ldots$, as indicated in the upper right box in FIG. 8. This is quantitatively inappropriate. Because of the similarity Y calculated from an inner product of the mixed labels as indicated in Expression (13), such inappropriate results are produced. In contrast, as indicated in the lower right box in FIG. 8, $C_{A'C1'}\approx 0.63$, $C_{A'C2'}\approx 0.37$, and $C_{A'C3'}\approx 0.37$ according to the present embodiment. Thus, $C_{A'C1'}>C_{A'C2'}=C_{A'C3'}$ are established, as expected. The similarity Z according to the present embodiment is therefore quantitatively appropriate. This is because the similarity Z according to the present embodiment is formulated based on qualitative and quantitative constraint conditions.

Next, the performance of the deep learning model trained in the representation learning process according to the present embodiment will be compared with the deep learning models according to the Comparative Example 1 and Comparative Example 2.

FIG. 9 is a table showing the classification accuracy of the deep learning models according to the present embodiment, Comparative Example 1, and Comparative Example 2. CIFAR-10 is adopted as a training data set, which is a set of samples. Supervised contrastive learning is adopted as a learning method. The data augmentation indicates types of data augmenting methods implemented upon samples, and four types of Bases, namely Random Horizontal Flip, Random Crop, Color Jitter, and Random Gray Scale, are used. "Base+Mixup" indicates the use of Mixup in addition to the Base, and "Base+CutMix" indicates the use of CutMix in addition to Base. The range of the mixture ratio indicates the possible range of the mixture ratio λ in Mixup and CutMix, respectively. When generating mixed feature representations and mixed labels, the mixture ratio λ is determined within the range of the mixture ratio in accordance with a suitable probability distribution such as Gaussian distribution. As shown in FIG. 9, the classification accuracy can be improved through the data augmentation of a mixed type.

FIG. 10 is a table showing scores obtained in an out-of-distribution detection conducted upon multiple detection targets. CIFAR-10 is adopted as a training data set. Supervised contrastive learning is adopted as a learning method. The task of the deep learning models is an out-of-distribution (OOD) detection. A score indicates the accuracy evaluation for the out-of-distribution detection, for which the Area Under Receiver Operating Characteristic curve (AUROC) and Area Under the Precision-Recall curve (AUPR) are used. CIFAR-100, SVHN, MNIST, and Random are detection targets. Base and Base+CutMix are used in the data augmentation at the time of training of the deep learning. As shown in FIG. 10, improvement in the out-of-distribution detection performance can be achieved through the data augmentation of a mixed type.

Example 2

The representation learning apparatus 100 according to Example 2 will be described. In comparison with Example 1, the representation learning apparatus 100 according to Example 2 does not include a step of extracting the second mixed feature representations from the first mixed feature representations (step S206). In other words, the deep learning model according to Example 2 does not include a feature extracting layer 303.

FIG. 11 is a diagram showing the procedure of the representation learning process according to Example 2. Steps S1101 through S1105 are the same as steps S201 through S205 in FIG. 2, and the explanation thereof is therefore omitted.

After step S1105, the similarity calculation unit 13 calculates L similarities from the M mixed labels (step S1106). Step S1106 is the same as step S207 in FIG. 2.

After step S1106, the loss function computation unit 14 performs a computation of a loss function (step S1107). At step S1107, the loss function computation unit 14 performs the computation of the loss function to determine a loss, based on M mixed feature representations generated at step S1104 and the L similarities calculated at step S1106. The loss function according to Example 2 can be computed by replacing the second mixed feature representations according to Example 1 with the mixed feature representations generated at step S1104.

After step S1107, the optimization unit 15 updates the deep learning model based on the loss function computed at step S1107 (step S1108). At step S1108, the optimization unit 15 updates the weighting parameter of the feature extracting layer 301 in the deep learning model. The optimizing method may be conducted in the same manner as at step S209.

After step S1108, the optimization unit 15 determines whether the updates should be terminated (step S1109). At step S1109, the optimization unit 15 determines whether the condition for update termination has been satisfied. If it is determined that the terminating condition is not satisfied (no at step S1109), steps S1101 through S1109 are executed based on the newly set number N of samples and the newly set number N of labels so that steps S1101 through S1109 are repeated until it is determined that the terminating condition is satisfied. If it is determined that the terminating condition is satisfied (yes at step S1109), the optimization unit 15 terminates the representation learning process. The output control unit 16 outputs the deep learning model obtained through the iterative steps at which the terminating condition has been satisfied, as a trained deep learning model.

In the above manner, the representation learning process of Example 2 is terminated.

The procedure of the representation learning process indicated in FIG. 11 is presented merely as an example, and should not be limited to FIG. 11. For instance, step S1102 should be executed before step S1105, but need not always be executed between step S1101 and step S1103.

Example 3

The representation learning apparatus 100 according to Example 3 will be described. In comparison with Example 1, the representation learning apparatus 100 according to Example 3 mixes samples, instead of the first feature representations.

FIG. 12 is a diagram showing the procedure of the representation learning process according to Example 3. Steps S1201 through S1202 are the same as steps S201 through S202 in FIG. 2, and the explanation thereof is therefore omitted.

After step S1202, the sample acquisition unit 11 generates M mixed samples from the N samples, using the deep learning model (step S1203). In particular, the sample acquisition unit 11 forms $N^K$ sample combinations from N samples. Here, $N^K=M$ is established. The sample combinations are formed by any number K of samples selected from the N samples. The K selected samples may include the same samples. The sample acquisition unit 11 forms $N^K$ mixed samples by mixing the K samples that constitute each of the $N^K$ sample combinations. The method of mixing the samples is not particularly limited. For instance, a method such as CutMix or Mixup may be adopted.

After step S1203, the sample acquisition unit 11 extracts the M first mixed feature representations from the M mixed samples, using the deep learning model (step S1204).

Steps S1205 through S1210 are the same as steps S205 through S210 in FIG. 2. That is, at step S1205, the label acquisition unit 12 generates M first mixed feature representations from the N feature representations, using the deep learning model 30. At step S1206, the sample acquisition unit 11 extracts M second mixed feature representations from the M first mixed feature representations, using the deep learning model. At step S1207, the similarity calculation unit 13 calculates the L similarities from the M mixed labels. At step S1208, the loss function computation unit 14 performs a computation of a loss function based on the M second mixed feature representations and the L similarities. At step S1209, the optimization unit 15 updates the deep learning model based on the loss function. The loss function according to Example 3 according to Example 1 can be computed by replacing the second mixed feature representations of Example 1 with the second mixed feature representations generated at step S1304. At step S1210, the optimization unit 15 determines whether the terminating condition has been satisfied, and repeats steps S1201 through S1210 until the terminating condition is satisfied. If it is determined that the terminating condition has been satisfied, the representation learning process is terminated.

In the above manner, the representation learning process of Example 3 is terminated.

The procedure of the representation learning process indicated in FIG. 12 is presented merely as an example, and should not be limited to FIG. 12. For instance, step S1202 should be executed before step S1205, but need not always be executed between step S1201 and step S1203. Furthermore, step S1205 should be executed between step S1202 and step S1207, but need not always be executed before step S1206.

Example 4

The representation learning apparatus 100 according to Example 4 will be described below. In comparison with Example 3, the representation learning apparatus 100 according to Example 4 does not include a step of extracting the second mixed feature representations from the first mixed feature representations (step S1206). In other words, the deep learning model according to Example 4 does not include a feature extracting layer 303.

Figure 13:
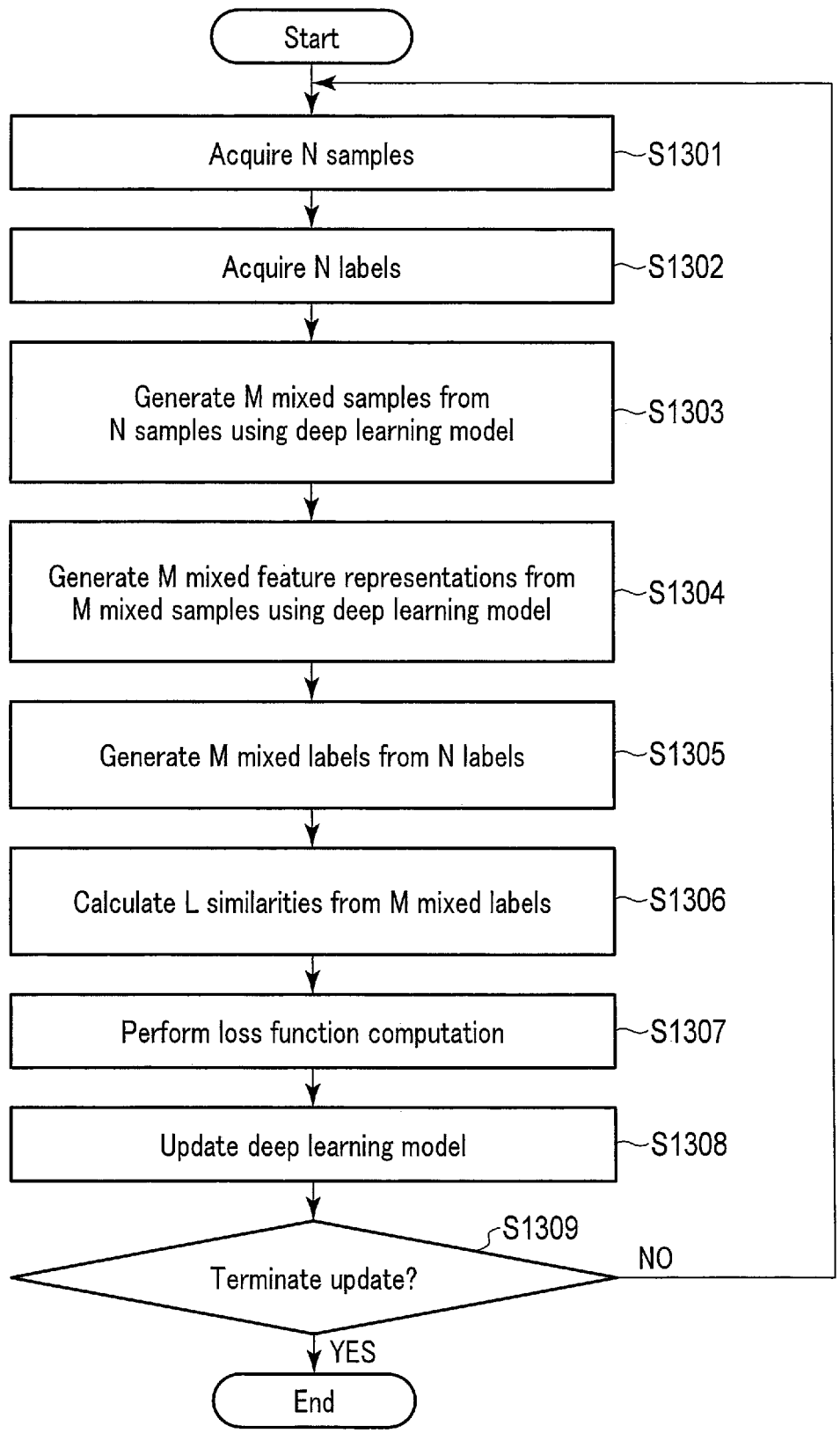
FIG. 13 is a diagram for showing the procedure of the representation learning process according to Example 4.

FIG. 13 is a diagram showing the procedure of the representation learning process according to Example 4. Steps S1301 through S1305 are the same as steps S1201 through S1205 in FIG. 12, and the explanation thereof is therefore omitted.

After step S1305, the similarity calculation unit 13 calculates the L similarities from the M mixed labels (step S1306). Step S1106 is the same as step S207 in FIG. 2.

After step S1306, the loss function computation unit 14 performs a computation of a loss function (step S1307). At step S1307, the loss function computation unit 14 performs the computation of the loss function to find a loss, based on the M mixed feature representations generated at step S1304 and the L similarities calculated at step S1306. The loss function according to Example 4 can be computed by replacing the second mixed feature representations according to Example 1 with the mixed feature representations generated at step S1304.

After step S1307, the optimization unit 15 updates the deep learning model, based on the loss function computed at step S1307 (step S1308). At step S1308, the optimization unit 15 updates the weighting parameter of the feature extracting layer 301 in the deep learning model. The optimizing method may be conducted in the same manner as at step S209.

After step S1308, the optimization unit 15 determines whether the updating should be terminated (step S1309). At step S1309, the optimization unit 15 determines whether the condition for terminating the updating has been satisfied. If it is determined that the terminating condition is not satisfied (no at step S1309), steps S1301 through S1309 are executed based on the newly set number N of samples and the newly set number N of labels, and steps S1301 through S1309 are repeated until it is determined that the terminating condition is satisfied. If it is determined that the terminating condition is satisfied (yes at step S1309), the optimization unit 15 terminates the representation learning process. The output control unit 16 outputs the deep learning model obtained through the iterative steps at which the terminating condition has been satisfied as a trained deep learning model.

In the above manner, the representation learning process of Example 4 is terminated.

The procedure of the representation learning process indicated in FIG. 13 is presented merely as an example, and should not be limited to FIG. 13. For example, step S1302 should be executed before step S1305, but need not always be executed between steps S1301 and S1303.

Summarization

In Examples 1 to 4, the loss function is adopted to update the deep learning model. The use of the loss function according to the present embodiment, however, is not limited thereto. Furthermore, the mixed feature representation is generated based on the samples by the representation learning apparatus 100. However, it may be generated by an outside computer that is not the representation learning apparatus 100. In this case, the representation learning apparatus 100 receives the data of the mixed feature representation generated by the outside computer by way of the communication device 4 or a portable storage medium.

FIG. 14 is a diagram showing the procedure of the representation learning process according to the present embodiment. As illustrated in FIG. 14, the sample acquisition unit 11 acquires the M mixed feature representations based on the N samples (step S1401). The "acquisition" according to the present embodiment represents the representation learning apparatus 100 acquiring data in a broad sense. The acquisition according to the present embodiment therefore encompasses generation or calculation of data by the representation learning apparatus 100 and reception of data from an outside computer. The mixed feature representation acquired at step S1401 may be the first mixed feature representation according to Example 1, the second mixed feature representation according to Example 1, the mixed feature representation according to Example 2, the first mixed feature representation according to Example 3, the second mixed feature representation according to Example 3, or the mixed feature representation according to Example 4.

After step S1401, the label acquisition unit 12 acquires M mixed labels based on N labels (step S1402). At step S1402, the label acquisition unit 12 may generate a mixed label by mixing the labels as indicated in Examples 1 to 4, or may receive a mixed label from an outside computer.

After step S1402, the similarity calculation unit 13 calculates the similarity of the L label combinations from the M mixed labels acquired at step S1402 (step S1403). The method for calculating the similarity at step S1403 is the same as the similarity calculating method of the above Examples 1 to 4.

After step S1403, the loss function computation unit 14 performs a computation of the loss function based on the M mixed feature representations acquired at step S1401 and the L similarities calculated at step S1403 (step S1404). The method for calculating the loss function at step S1404 is the same as the loss function calculating method of the above Examples 1 to 4.

After step S1404, the representation learning process according to the present embodiment is terminated. The loss acquired through the computation of the loss function may be used for the update of the deep learning model as indicated in Examples 1 to 4. If a different computer is configured to update the deep learning model, the data of the loss may be transferred to this computer. The loss may be used for other purposes; for instance, determination of an abnormal sample for the created deep learning model may be based on the size of the loss at the time of extracting samples.

The representation learning process according to the present embodiment is not limited to the above examples. In the above examples, the similarity calculation unit 13 calculates L similarities for L label combinations selected from the M mixed labels. The similarity calculation unit 13, however, may calculate the L similarities for the L label combinations selected from the M mixed labels and the N labels. In this case, each of the L label combinations may include a mixed label and a label. That is, not only the similarities between mixed labels but also the similarities between labels and mixed labels may be calculated.

(Evolutionary Examples)

According to the present embodiment, the loss function is designed in advance. The representation learning apparatus 100 according to an evolutionary example designs a loss function depending on various requirements. The representation learning apparatus 100 according to the evolutionary example will be described below. In the description below, the same numerals are assigned to the structural components having approximately the same functions as the ones in the above embodiment. The explanation of these components will be given only where necessary.

Figure 15:
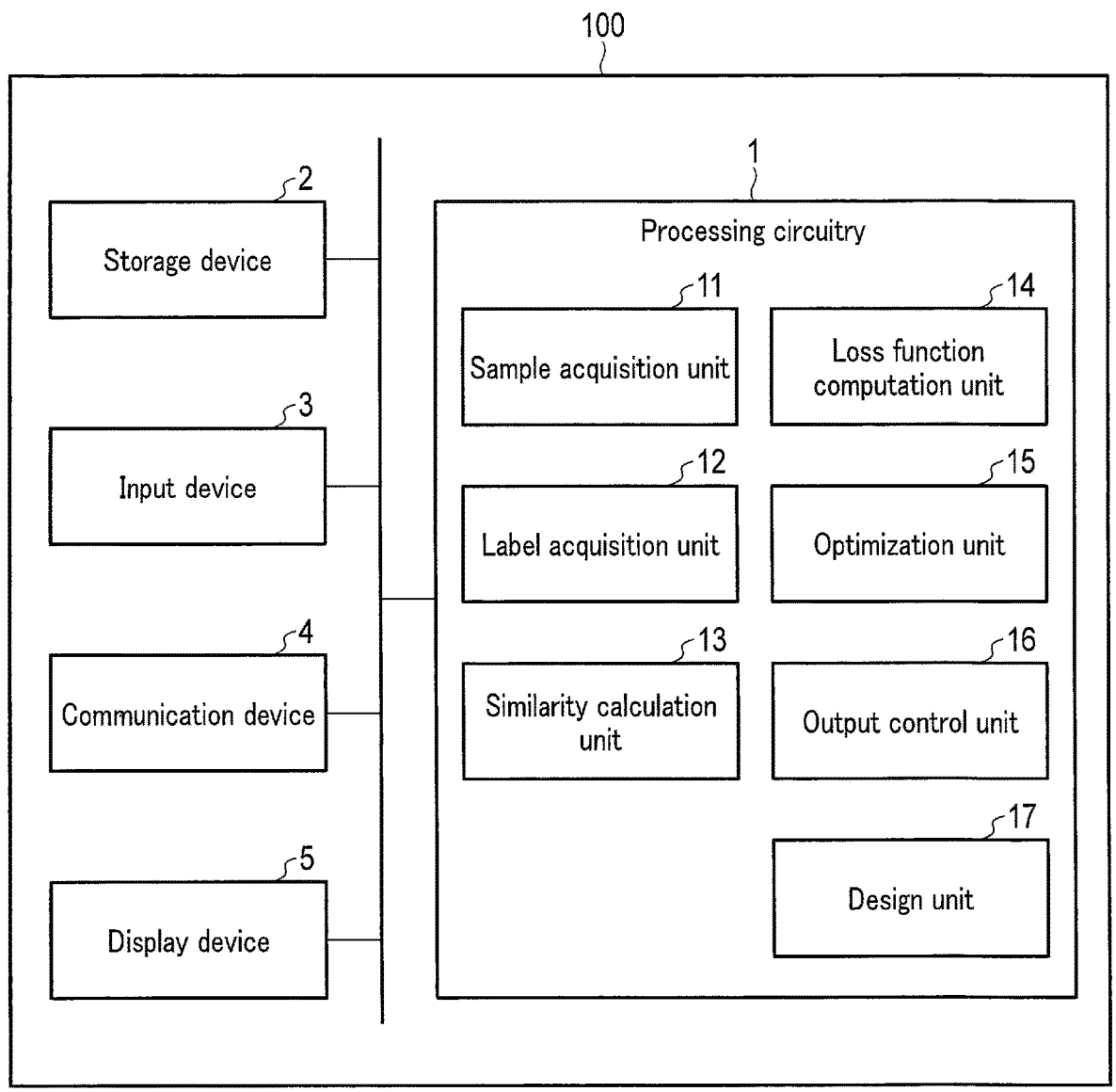
FIG. 15 is a diagram for showing an exemplary configuration of a representation learning apparatus according to an evolutionary example.

FIG. 15 is a diagram for showing an exemplary configuration of the representation learning apparatus 100 according to an evolutionary example. As illustrated in FIG. 15, the processing circuitry 1 further includes a design unit 17. The design unit 17 designs a loss function.

FIG. 16 is a diagram for schematically showing an exemplary design of a loss function according to an evolutionary example. As indicated in FIG. 16, the loss function according to the evolutionary example is a function in which the similarity multiplied by a weight is applied to the contrastive loss term. The design unit 17 designs the weight based on the label type. The label type denotes the type of a mixed label, that is, either one of a supervised label, semi-supervised label, and self-supervised label. The design unit 17 assigns a weight to a value corresponding to the label type. In particular, the design unit 17 designs weights in accordance with the combination of mixed labels relating to the first mixed label and second mixed label that constitute a label combination. If the first mixed label and second mixed label are both supervised labels or self-supervised labels, the weight for the similarity of the first mixed label to the second mixed label is set to the same value as the weight for the similarity of the second mixed label to the first mixed label. If the first mixed label is a supervised label and the second mixed label is a self-supervised label or semi-supervised label, the weight for the similarity of the first mixed label to the second mixed label is set to a value larger than the weight for the similarity of the second mixed label to the first mixed label. This is because a higher degree of reliability can be expected for a supervised label than for a self-supervised label or semi-supervised label.

With the weight of the similarity designed in accordance with the label type, the accuracy of the loss function can be improved, as a result of which improvement can also be expected in deep learning model accuracy.

As indicated in FIG. 16, the design unit 17 designs the contrastive loss term based on the correlation calculating method. In particular, the correlation calculating method represents the type of the formula, such as Expressions (6), (7), and (8), defining the correlation in the contrastive loss term. The correlation defining formula may be set to any type by the user by way of the input device 3, or may be automatically set in accordance with the tasks of the deep learning model and features of the samples. As the correlation calculating method, the design unit 17 may design a contrastive loss term based on the K elements that constitute the sample combination and label combination. The correlation defining formula of the contrastive loss term is determined in accordance with the number K. The number K may be set to any type by the user by way of the input device 3, or may be automatically set.

As described above, the design unit 17 according to the evolutionary example can design the weights, similarities, and contrastive loss term that constitute a loss function. With such a design unit 17, the loss function can be designed flexibly in accordance with the samples, labels, and tasks of the deep learning model. Consequently, the accuracy of similarities and loss function can be improved, as a result of which improved representation learning accuracy can also be expected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A representation learning apparatus comprising processing circuitry configured to:
acquire M (M is a natural number) first-type mixed feature representations, M second-type mixed feature representations, M third-type mixed feature representations, or M fourth-type mixed feature representations, the M first-type mixed feature representations being obtained by mixing feature representations of N (N is a natural number) samples, the M second-type mixed feature representations being extracted from the M first-type mixed feature representations, the M third-type mixed feature representations being feature representations that are extracted from M mixed samples obtained by mixing the N samples, and the M fourth-type mixed feature representations being feature representations that are extracted from the M third-type mixed feature representations;

acquire M mixed labels that are obtained by mixing N labels respectively corresponding to the N samples;

calculate L (L is a natural number) similarities of L label combinations selected from the M mixed labels, each of the L label combinations having K mixed labels selected from the M mixed labels, each of the L similarities representing a degree of similarity among the K mixed labels, the L similarities being formulated based on a qualitative and quantitative constraint condition to be satisfied by the similarities; and perform a computation of a loss function based on the L similarities and the M mixed feature representations of any one of the first to fourth types.

2. The representation learning apparatus according to claim 1, wherein the constraint condition includes:
the similarities taking a lowermost value when the K mixed labels are same;
the similarities taking an uppermost value when the K mixed labels are the most similar to each other;
the similarities taking a lowermost value when the K mixed labels are the least similar to each other; and/or
the similarities taking the save value when the K mixed labels demonstrate symmetry.

3. The representation learning apparatus according to claim 1, wherein
the processing circuitry calculates the L similarities formulated based on Jensen-Shannon divergence or cosine similarity.

4. The representation learning apparatus according to claim 1, wherein the processing circuitry is configured to:
acquire the N samples;
extract N first-type feature representations from the N samples;
generate the M first-type mixed feature representations by mixing the N first-type feature representations;
extract the M second mixed feature representations from the M first-type mixed feature representations;
acquire the N labels corresponding to the N samples;
generate the M mixed labels by mixing the N labels; and
perform the computation of the loss function in which the L similarities are applied to a contrastive loss term in which a correlation of K second-type mixed feature representations in each of L sample combinations selected from the M second-type mixed feature representations is described.

5. The representation learning apparatus according to claim 4, wherein the processing circuitry is configured to:
extract the N first-type feature representations by inputting the N samples to a first network layer included in a deep learning model; and
extract the M second-type mixed feature representations by inputting the M first-type mixed feature representations to a second network layer included in the deep learning model, the second network layer being provided downstream of the first network layer.

6. The representation learning apparatus according to claim 5, wherein the processing circuitry is further configured to update the deep learning model based on the loss function.

7. The representation learning apparatus according to claim 1, wherein
the processing circuitry is configured to acquire, as each of the N labels, a supervised label, a self-supervised label, or a semi-supervised label, wherein the supervised label is assigned to a sample by a user, the self-supervised label is assigned based on a distribution of feature representations of the sample or a type of the sample, and the semi-supervised label is assigned based on a distribution of feature representations of other samples having a supervised label, a distribution of feature representations of a sample having no supervised label, and the type of the sample.

8. The representation learning apparatus according to claim 7, wherein
the processing circuitry is configured to calculate L products based on L weights and the L similarities, and perform the computation of the loss function based on the M mixed feature representations of any one of the first to fourth types and the L products,
the L weights respectively have a value corresponding to the type of each of the K mixed labels, and
the type indicates any one of the supervised label, the self-supervised label, and the semi-supervised label.

9. The representation learning apparatus according to claim 1, wherein
the processing circuitry is configured to calculate the L similarities of the L label combinations selected from the M mixed labels and the N labels.

10. A representation learning method comprising:
acquiring M (M is a natural number) first-type mixed feature representations, M second-type mixed feature representations, M third-type mixed feature representations, or M fourth-type mixed feature representations, the M first-type mixed feature representations being obtained by mixing feature representations of N (N is a natural number) samples, the M second-type mixed feature representations being extracted from the M first-type mixed feature representations, the M third-type mixed feature representations being feature representations that are extracted from M mixed samples obtained by mixing the N samples, and the M fourth-type mixed feature representations being feature representations that are extracted from the M third-type mixed feature representations;
acquiring M mixed labels obtained by mixing N labels respectively corresponding to the N samples;
calculating L (L is a natural number) similarities of L label combinations selected from the M mixed labels, each of the L label combinations having K mixed labels selected from the M mixed labels, each of the L similarities representing a degree of similarity of the K mixed labels, the L similarities being formulated based on a qualitative and quantitative constraint condition to be satisfied by the similarities; and
performing a computation of a loss function based on the M mixed feature representations of any of the first to fourth types and the L similarities.

11. A non-transitory computer readable storage medium including computer executable instructions, wherein the instructions, when executed by a processor, cause the processor to perform operations comprising:
acquiring M (M is a natural number) first-type mixed feature representations, M second-type mixed feature representations, M third-type mixed feature representations, or M fourth-type mixed feature representations, the M first-type mixed feature representations being obtained by mixing feature representations of N (N is a natural number) samples, the M second-type mixed feature representations being extracted from the M first-type mixed feature representations, the M third-type mixed feature representations being feature representations that are extracted from M mixed samples obtained by mixing the N samples, or the M fourth-type mixed feature representations being feature representations that are extracted from the M third-type mixed feature representations;

acquiring M mixed labels that are obtained by mixing N labels respectively corresponding the N samples;

calculating L (L is a natural number) similarities of L label combinations selected from the M mixed labels, each of the L label combinations having K mixed labels selected from the M mixed labels, each of the L similarities representing a degree of similarity of the K mixed labels, the L similarities being formulated based on a qualitative and quantitative constraint condition to be satisfied by the similarities; and performing a computation of a loss function based on the M mixed feature representations of any one of the first to fourth types and the L similarities.

* * * * *